Oct. 30, 1962 W. R. WATT 3,061,601
GAS PHASE POLYMERIZATION OF OLEFINS
Filed Feb. 10, 1960
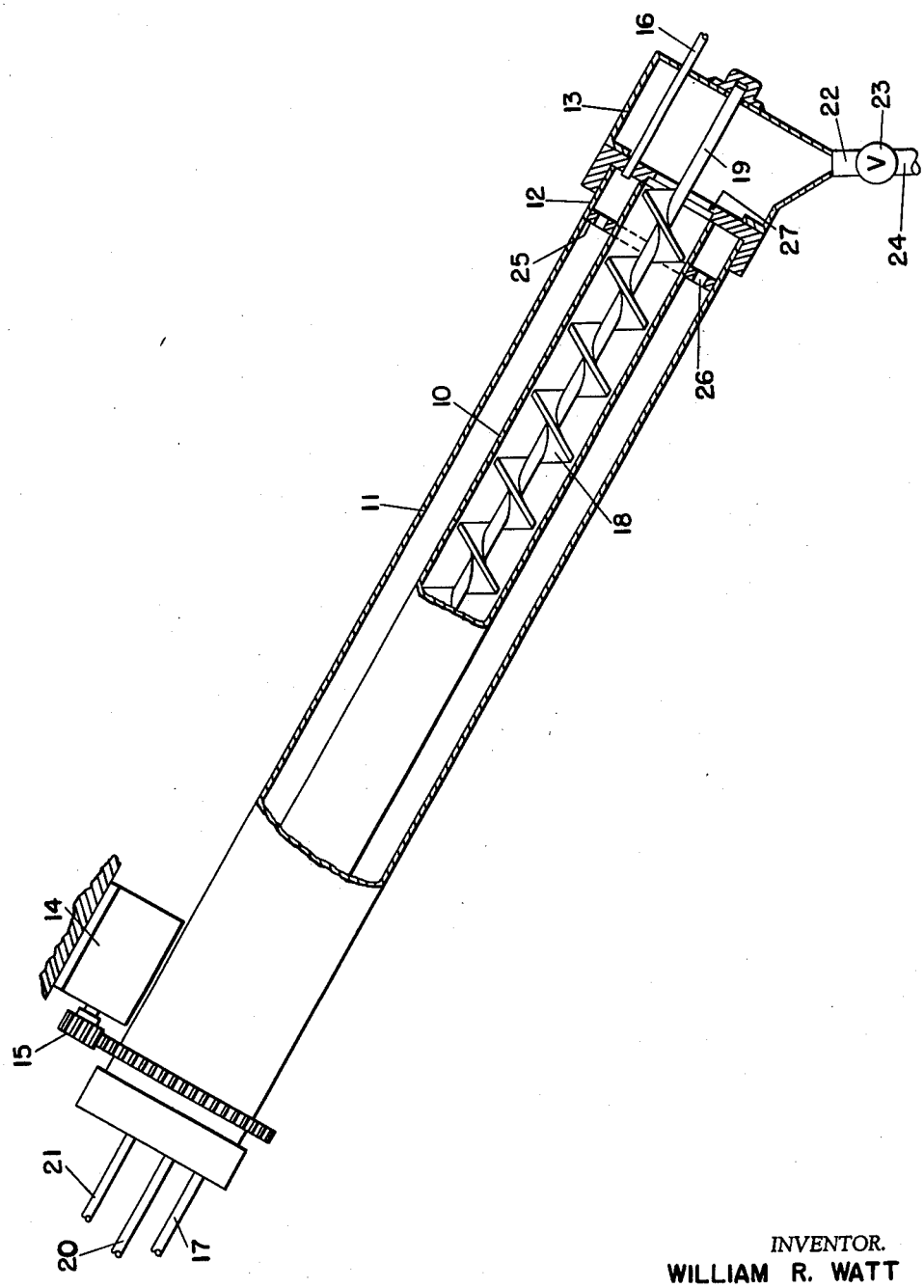
INVENTOR.
WILLIAM R. WATT
BY
Robert O. Spurdle
ATTORNEY 3,061,601
GAS PHASE POLYMERIZATION OF OLEFINS
William R. Watt, Newark, Del., assignor to American Viscose Corporation, Philadelphia, Pa., a corporation of Delaware
Filed Feb. 10, 1960, Ser. No. 7,824
3 Claims. (Cl. 260—93.7)

This invention relates to a process for the polymerization of olefins and more particularly to a process for the polymerization of ethylene, propylene, and butene-1, and mixtures thereof, in the presence of a coordination complex catalyst but in the absence of a liquid reaction medium. It is known to polymerize olefins such as ethylene, propylene, and butene-1 in the presence of a coordination complex catalyst such as the reaction product of a titanium or vanadium halide and an organometallic compound such as an aluminum alkyl or alkyl halide. Specific examples of such catalyst systems, any of which may be used in practicing the present invention, may be found on pages 328 to 361 of Linear and Stereoregular Addition Polymers, by Gaylord and Mark, Interscience Publishers, New York, 1959. Such polymerizations are generally carried out in an inert liquid medium such as heptane, isooctane, benzene or toluene. At the end of the polymerization the reaction mixture is treated with an alcohol in order to dissolve the catalyst and to free the polymer of occluded inorganic contamination. This necessarily results in the destruction of the catalyst, which cannot be recovered for reuse in a subsequent polymerization. It also contaminates the inert liquid medium with alcohol, and the inert liquid must be thoroughly purified, with attendant expense, before it can be recycled to the polymerization step.

Proposals have been made in the past that the polymerization be carried out in the absence of a liquid reaction medium, in order to save the expense of purifying it after removal of catalyst from the polymer. Such a process is shown in U.S. Patent 2,846,426 to Larson et al., which describes a process in which titanium tetrachloride and aluminum triethyl, both in vapor phase, are brought together in the presence of the olefin to be polymerized. Such processes suffer from the defect that control of the temperature of the reaction is extremely difficult, and from the further defect that the catalyst is occluded in the polymer, and must be deactivated before it can be removed therefrom.

It is an object of this invention to provide a process for the polymerization of olefins wherein no liquid reaction medium is required and wherein the polymer may be separated from the catalyst without deactivating the latter, so that it will remain active for further polymerization.

I have now found that the foregoing objects can be obtained by dispersing the catalyst components in a molten hydrocarbon which has a melting point higher than the temperature at which the polymerization is to be carried out, coating a surface with a thin film of the molten dispersion, cooling the surface to below the melting point of the hydrocarbon, and thereafter contacting the olefin to be polymerized with the film at polymerization temperature, while maintaining the temperature of the surface below the melting point of the hydrocarbon. Hydrocarbons suitable for use in my process include paraffin wax, phenanthrene, camphane, hexamethyl benzene, naphthalene, anthracene, and the like high-melting hydrocarbons. It will be found that the monomer will polymerize at the surface and will build outwardly therefrom. Since the catalyst is bound tightly to the surface by the solidified hydrocarbon, it is possible to scrape off polymer continuously as it is formed, without disturbing the catalyst, and to recover polymer free of catalyst components directly from the reactor. The polymer is laid down on the surface apparently as a somewhat porous mass, even though it appears to be solid, since the monomer will diffuse to the catalyst through a considerable thickness of polymer.

In order to demonstrate the ease with which the monomer can diffuse through polymer to the catalyst, the following example is given. Forty-eight grams of paraffin wax which was refluxed over lithium aluminum hydride for several hours and redistilled under reduced pressure immediately before use, was placed in a 300 ml. flask fitted with a high speed stirrer, thermometer, and heater. The flask was then flushed with dry nitrogen to remove oxygen and moisture. The wax was heated to its melting point (about 60° C.), and 5 ml. of titanium tetrachloride was added slowly. With rapid stirring, 15 ml. of triisobutyl aluminum was added dropwise at such a rate that the temperature did not exceed 100° C. After all the aluminum triisobutyl had been added, the mixture was stirred for ten minutes, maintaining the wax in a molten condition by gentle heating. The contents of the flask were then poured into a shallow dish under an atmosphere of nitrogen, and the molten mixture was allowed to cool, forming a solid cake.

About two grams of this cake was placed in a glass tube ten inches long and ¾ inch in diameter. The tube was heated until the wax melted, and, by rotating the tube, a uniform coating of the wax-catalyst mixture was spread over the interior wall of the tube. The tube was cooled to room temperature in order to solidify the wax, and ethylene was introduced from a compressed gas cylinder. Ethylene was thereafter continuously added in an amount equal to the rate at which it was consumed in the formation of polymer, maintaining the apparatus under a slight positive pressure of 1–2 mm. of mercury. Within two hours there was visual evidence of polymer formation. Within sixteen hours the tube had become packed solid with polymer and shattered from the internal pressure. Polymer was recovered in the form of a solid rod 18 mm. in diameter and about eight inches long. Yield was about 100 grams of polymer per gram of titanium tetrachloride.

While the foregoing example demonstrates that the monomer can diffuse to the catalyst surface through a considerable thickness of preformed polymer in order to form additional polymer, the procedure followed is a batch process, with its attendant disadvantages. The process may also be carried out in a continuous manner, as hereinafter described in connection with the accompanying drawing, which is a cross-sectional view of an apparatus suitable for use in the continuous practice of my invention.

As may be observed from the drawing a reactor tube 10 having a concentric jacket 11 is carried in bearings 12 in frame 13. Tube 10 and jacket 11 are connected by spider 25, having openings 26 therein for the passage of cooling fluid. A similar spider (not shown) is located near the upper end of tube 10. Means are provided for rotating tube 10, for example, motor 14 and associated gear train 15. Line 16 is provided for introducing heat exchange fluid into the space between tube 10 and jacket 11, and the fluid is withdrawn from the space via line 17. A stationary helix 18 is carried on rod 19 within tube 10, there being a slight clearance, for example ¼ inch, between the outer edge of helix 18 and the walls of tube 10. In starting up the polymerization reaction a suspension of catalyst in a high melting hydrocarbon, for example a 25% by weight suspension of a titanium trichloride-aluminum diethyl chloride complex in phenanthrene, at a temperature of 110° C., is introduced slowly into tube 10 via line 20, while rotating tube 10, whereby to spread a thin film of the catalyst suspension on the walls of tube 10, while maintaining the temperature of the tube walls at a temperature above the melting point of phenanthrene. Passage of the catalyst suspension to the tube is continued until the interior wall of tube 10 has been substantially completely covered with a film of the suspension of catalyst in phenanthrene, after which the temperature of the fluid in jacket 11 is adjusted to cool the wall of tube 10 to 80° C., whereby to solidify the phenanthrene and to cause the catalyst to adhere tightly to the walls of the tube. The tube 10 is then pressured to 60 p.s.i.g. with propylene admitted through line 21.

Polymerization takes place immediately on the walls of the tube and soon builds up until it contacts the edge of helix 18 to exert a scraping action on the polymer whereby to remove polymer as it builds up and to convey the scraped-off polymer to hopper 22, from which it is removed via star valve 23 and line 24. A circular lug 27 is provided at the bottom of tube 10 in order to prevent the forcing of all of the polymer and the catalyst substrate into hopper 22.

While the foregoing description relates to the polymerization of propylene, ethylene and butene-1 may be polymerized in the same manner. When polymerizing ethylene, however, the temperature is preferably about 25° C., instead of the 80° C. used for the polymerization of propylene. Mixtures of these olefins may also be polymerized in this manner to yield solid copolymers.

The invention claimed is:

1. A process for the polymerization of olefins which comprises coating a solid surface with a dispersion of a coordination complex polymerization catalyst in a molten normally solid hydrocarbon, cooling the surface to solidify the hydrocarbon, contacting the coated surface with an olefin selected from the group consisting of ethylene, propylene and butene-1 and mixtures thereof at a temperature below the melting point of the hydrocarbon, whereby to initiate polymerization of the olefin, and recovering solid polymer from the surface.

2. The process according to claim 1 in which the olefin is ethylene, the normally solid hydrocarbon is paraffin wax, and the temperature of contacting is about 25° C.

3. The process according to claim 1 in which the olefin is propylene, the hydrocarbon is phenanthrene, and the temperature of contacting is about 80° C.

References Cited in the file of this patent

UNITED STATES PATENTS

| | | |
|---|---|---|
| 2,921,054 | Kennedy | Jan. 12, 1960 |
| 2,924,591 | Roelen | Feb. 9, 1960 |
| 2,935,495 | Kennedy | May 3, 1960 |